(12) United States Patent
Du et al.

(10) Patent No.: US 9,015,308 B2
(45) Date of Patent: Apr. 21, 2015

(54) MULTILAYER DISTRIBUTED PROCESSING SYSTEM

(75) Inventors: Qingjie Du, Tokyo (JP); Shinya Nakagawa, Tokyo (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 1662 days.

(21) Appl. No.: 12/162,979

(22) PCT Filed: Jan. 17, 2007

(86) PCT No.: PCT/JP2007/050587
§ 371 (c)(1),
(2), (4) Date: Jul. 31, 2008

(87) PCT Pub. No.: WO2007/088728
PCT Pub. Date: Aug. 9, 2007

(65) Prior Publication Data
US 2009/0013154 A1    Jan. 8, 2009

(30) Foreign Application Priority Data

Jan. 31, 2006   (JP) ................................. 2006-022841

(51) Int. Cl.
*G06F 15/173* (2006.01)
*G06F 9/46* (2006.01)
*G06F 9/50* (2006.01)

(52) U.S. Cl.
CPC .............. *G06F 9/466* (2013.01); *G06F 9/5055* (2013.01)

(58) Field of Classification Search
USPC .................................................. 709/205, 224
See application file for complete search history.

(56) References Cited

U.S. PATENT DOCUMENTS

| | | | |
|---|---|---|---|
| 2001/0042122 A1* | 11/2001 | Cote et al. ..................... | 709/224 |
| 2004/0122942 A1* | 6/2004 | Green et al. .................. | 709/224 |
| 2005/0022202 A1* | 1/2005 | Sannapa Reddy et al. ... | 718/105 |

FOREIGN PATENT DOCUMENTS

| | | |
|---|---|---|
| JP | H05-173988 | 7/1993 |
| JP | H05-307478 | 11/1993 |
| JP | H07-302242 | 11/1995 |
| JP | H10-069418 | 3/1998 |

* cited by examiner

*Primary Examiner* — Michael Chao
(74) *Attorney, Agent, or Firm* — Mannava & Kang

(57) ABSTRACT

The independencies of a plurality of layers executing dividingly a transaction can be easily enhanced. Anode (30) assigns to a transaction to anode (30) of a lower layer through a distributed transaction management section. The node (30) shares a predetermined transaction with the node (30) of the lower layer along with other nodes (30). The node (30) shared by the nodes (30) is a read-only node or a node to which data can be written by the characteristic of a function. Thus the node (30) searches for an unused node (30) in lower layers through the distributed transaction management section (34) when the node starts a new transaction. First, second, and third node hosts (3,4,5) check if each node (30) is used for which transaction or if each node (30) is used or not and store the results.

18 Claims, 14 Drawing Sheets

2, 3, 4, 5

Tier 1 Node Host 3 ( Tier 2 Node Host 4, Tier 3 Node Host 5 )

MULTILAYER DISTRIBUTED PROCESSING SYSTEM

PRIORITY CLAIM

The present invention is a national stage application under 35 U.S.C. 371 to Japanese PCT Application Serial No. PCT/JP2007/050587, filed on Jan. 17, 2007, which claims priority to Japanese Patent Application Serial No. JP2006-022841 (filed on Jan. 31, 2006, the disclosures of which are hereby incorporated by reference in their entireties.

TECHNICAL FIELD

The present invention relates to a multi-tier distributed system that executes a transaction by dividing the transaction into predetermined two or more tiers.

BACKGROUND ART

A multi-tier distributed system that executes a transaction by dividing the transaction into predetermined two or more tiers is known. It is a known technique to guarantee atomicity of an entire transaction in this kind of multi-tier distributed system by processing each tier of the transaction via a two-phase commit protocol and guaranteeing atomicity, consistency, isolation, and durability (ACID) of each individual tier (see Patent Document 1).

However, in the above-mentioned conventional example, a processing of one tier needs to be inserted into a processing of another tier, which raises a problem that independence of each tier cannot be enhanced. Further, in the case where one transaction takes a long time, a large storage apparatus for keeping a resource is required, and management and maintenance with respect to data update and the like become difficult. Patent Document 1: JP 10-69418 A

SUMMARY

Problem to be Solved by the Invention

The present invention has been made against the above-mentioned backdrop, and an object thereof is to provide a multi-tier distributed system that can easily enhance independence of two or more tiers into which a transaction is divided for execution thereof.

In order to achieve the above-mentioned object, the present invention provides a multi-tier distributed system for dividing one or more transactions into predetermined two or more tiers and executing each of the one or more transactions by combining one or more nodes provided to each of the tiers obtained by the dividing, including: an upper node belonging to an upper tier; and a lower node belonging to a lower tier, the upper node including monitoring means for monitoring a running status of the lower node with respect to the transaction, the lower node including: monitor enabling means for allowing the upper node to monitor the running status of the own node, which may be defined as a node that is monitored by the upper node; and a function section for providing the upper node with a service via the monitor enabling means according to the running status Preferably, the upper node further includes a first communication means for monitoring the lower node; and the lower node further includes a second communication means for providing the upper node with the service.

Further preferably, the upper node further includes node specifying means for specifying the lower node based on information unique to the lower node and the running status monitored via the monitoring means; and the specified lower node provides the upper node with the service.

Further preferably, the lower node further includes means for transmitting information for having the own node specified according to the running status and an attribute of the function section of the lower node in response to a request made by the upper node.

Further preferably, the lower node further includes: storage means for storing the information for having the own node specified; and update means for dynamically updating the information for having the own node specified.

Further preferably, a multi-tier distributed system further includes: version limiting means for limiting a version of one or more function sections according to the transaction; and control means for controlling the node specifying means to specify the node having the function section of the version limited by the version limiting means.

Further preferably, a plurality of the nodes, each having a different version of the function section from each other, are included in the same tier.

Further preferably, a multi-tier distributed system further includes a management assistant including: means for collecting use statuses of the nodes; and means for controlling the function of the node with respect to a specific status.

Further preferably, the management assistant further includes node updating means for dynamically updating the node specifying means of all of the nodes based on the use statuses of the nodes.

Further preferably, the management assistant further includes version updating means for dynamically specifying the node based on the use statuses of the nodes and updating a version of the node.

Effects of the Invention

According to the enhanced multi-tier distributed system of the present invention, it is possible to easily enhance the independence of two or more tiers into which a transaction is divided for execution thereof.

BRIEF DESCRIPTION OF THE DRAWINGS

FIG. 3 is a diagram exemplifying a structure of a transaction executable by a computer or the like.

BEST MODE FOR CARRYING OUT THE INVENTION

Multi-Tier Distributed System 1

Hereinafter, description will be made of an embodiment of the present invention.

Figure 1:
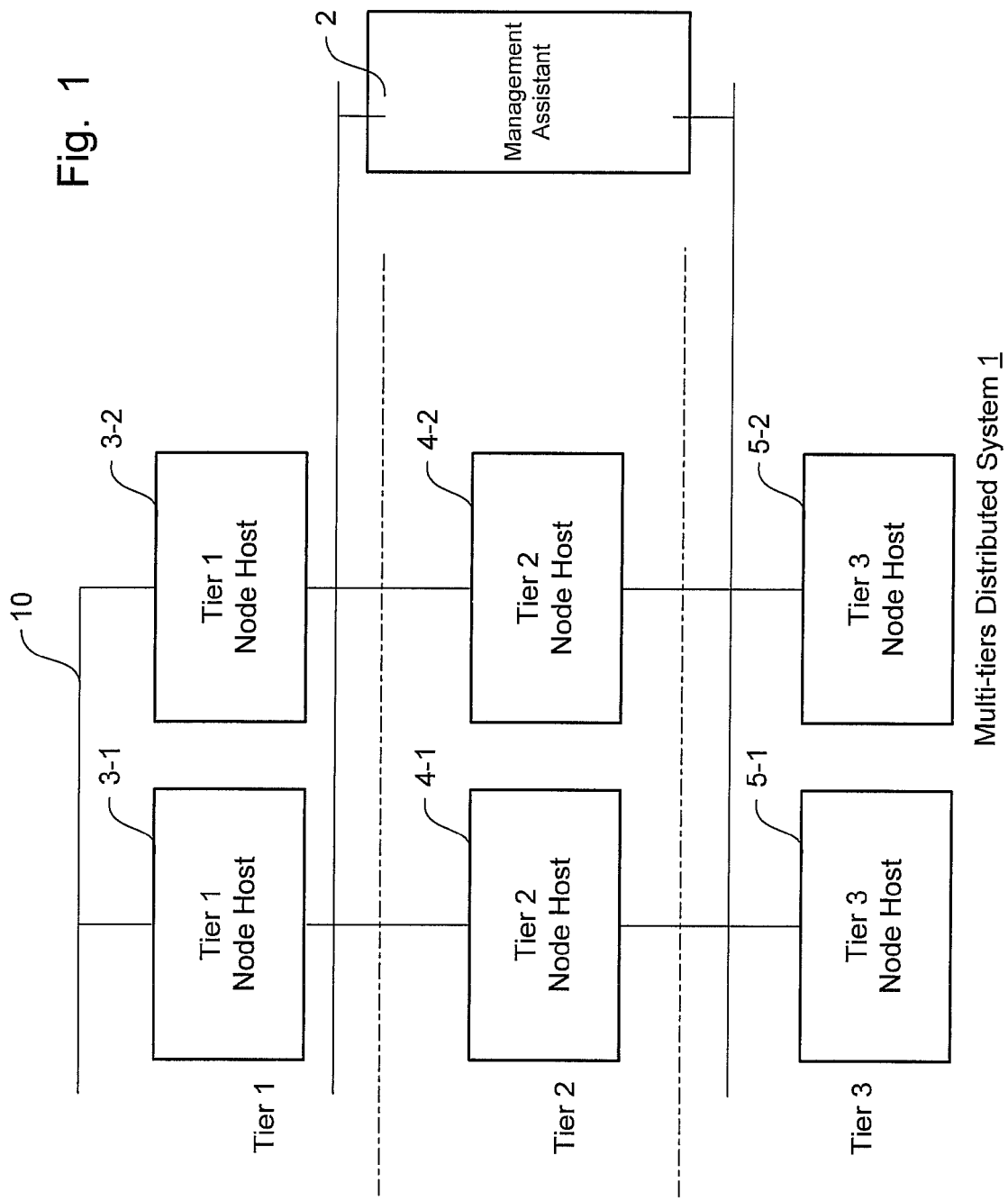
FIG. 1 is a diagram exemplifying a structure of a multi-tier distributed system according to the present invention.

FIG. 1 is a diagram exemplifying a structure of a multi-tier distributed system 1 according to the present invention.

As shown in FIG. 1, the multi-tier distributed system 1 is a network system that is composed of a management assistant 2, Tier1 node hosts 3-1 and 3-2, Tier2 node hosts 4-1 and 4-2, and Tier3 node hosts 5-1 and 5-2, which are connected to one another via a network 10 using TCP/IP, for example, and is configured to execute one or more transactions by dividing the transaction into, for example, Tier1 to Tier3.

Note that the number of tiers into which a transaction is divided in terms of a function may be 3 or more.

Further, the management assistant 2 is a component for assisting an administrator of the multi-tier distributed system 1, and is optionally provided to the multi-tier distributed system 1. That is, the multi-tier distributed system 1 is configured to be able to execute one or more transactions by dividing the transaction without having the management assistant 2.

Hereinafter, in a case of indicating one of the plurality of components of the same kind, such as the Tier1 node hosts 3-1 and 3-2, without particular specification, the one of the plurality of components may be abbreviated simply as "Tier1 node host 3" or the like.

Hardware

Figure 2:
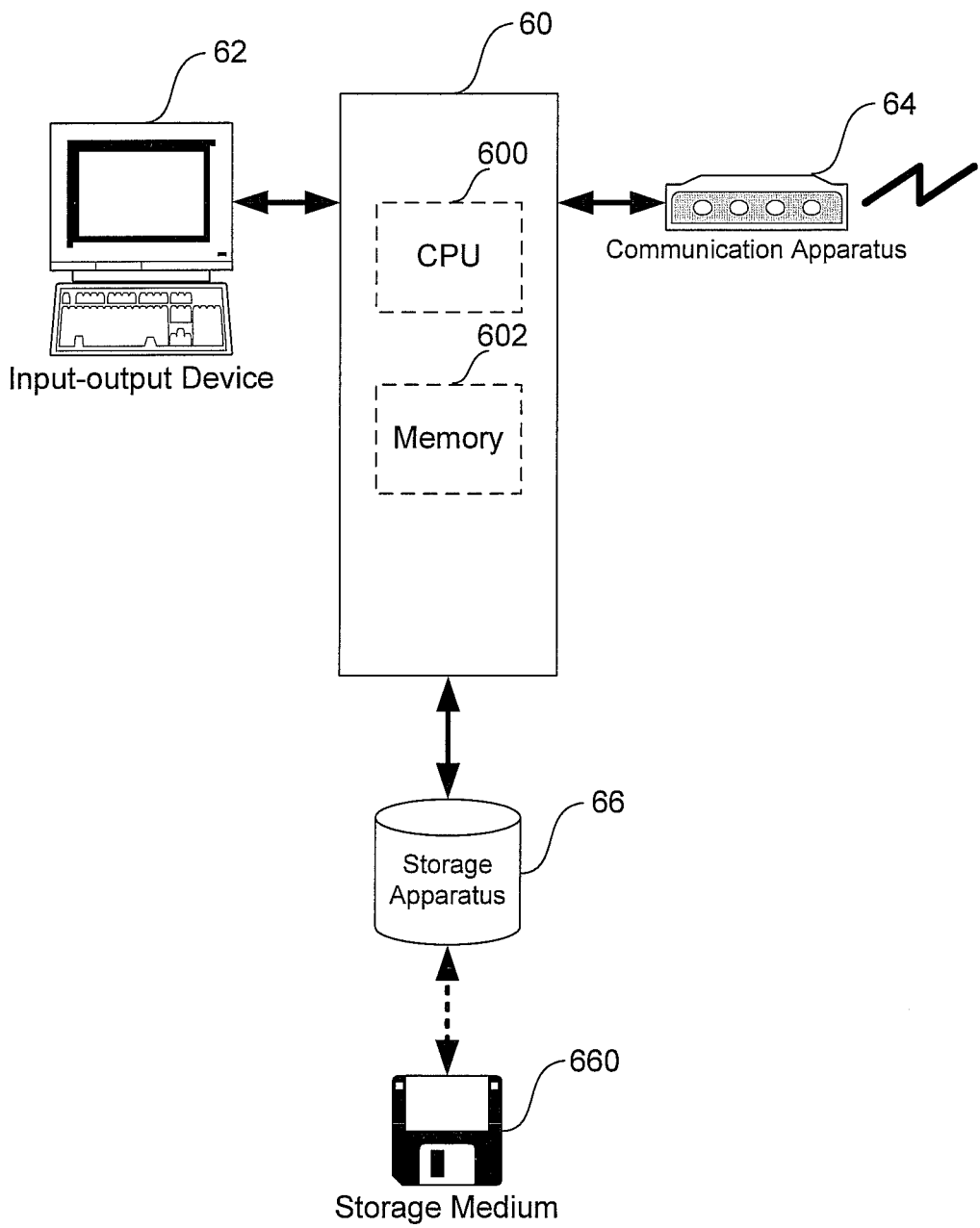
FIG. 2 is a diagram exemplifying a structure of a management assistant, a Tier1 node host, a Tier2 node host, and a Tier3 node host that are shown in FIG. 1.

FIG. 2 is a diagram exemplifying a structure of the management assistant 2, the Tier1 node host 3, the Tier2 node host 4, and the Tier3 node host 5 that are shown in FIG. 1.

As shown in FIG. 2, the management assistant 2, the Tier1 node host 3, the Tier2 node host 4, and the Tier3 node host 5 are each composed of a main body 60 including a CPU 600 and a memory 602, an input-output apparatus 62 including a display device and a keyboard, a communication apparatus 64 for performing communication, and a storage apparatus 66 such as a CD drive, an FD drive, and an HDD drive.

That is, the management assistant 2, the Tier1 node host 3, the Tier2 node host 4, and the Tier3 node host 5 each have components similar to a computer.

Example of Structure of Transaction

Next, a description will be made of an example of a structure of a transaction.

Figure 3:
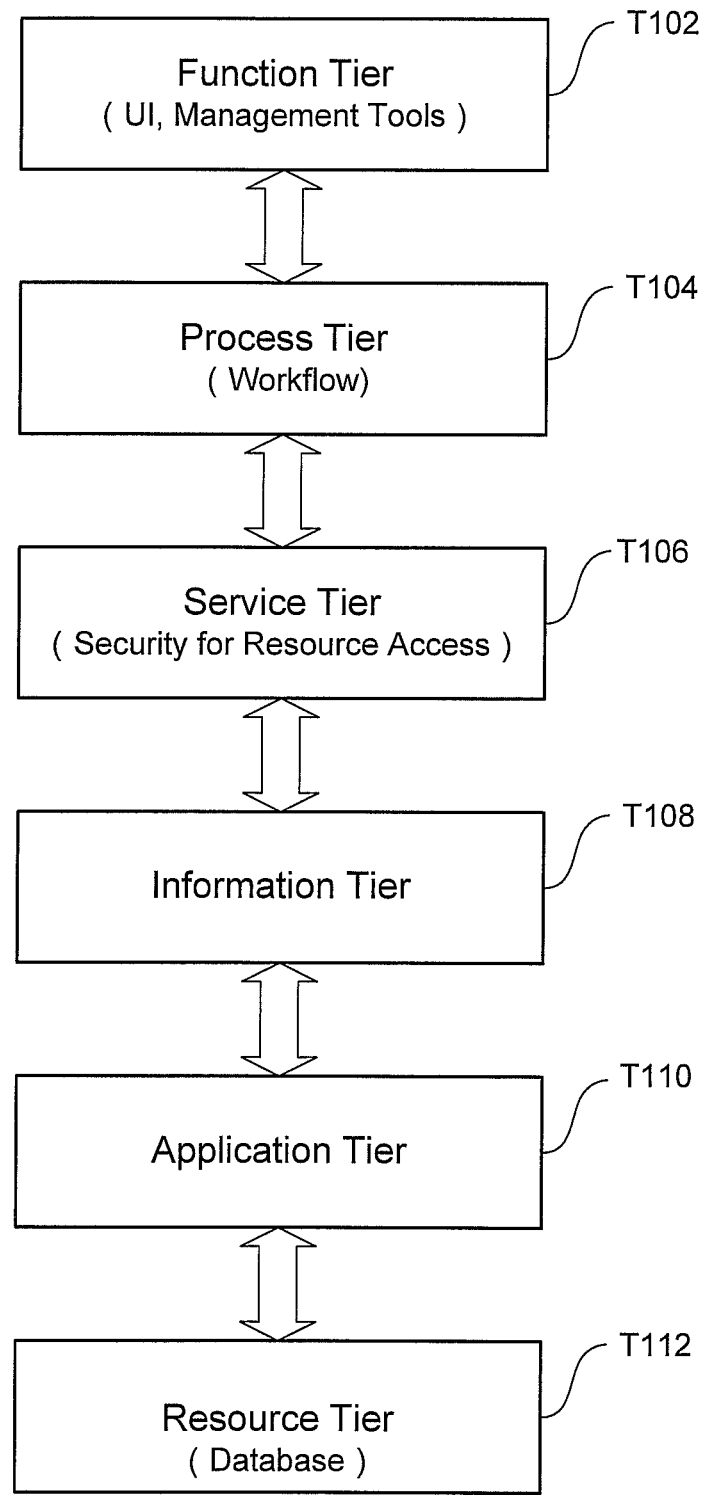

FIG. 3 is a diagram exemplifying a structure of a transaction T100 executable by a computer or the like.

As shown in FIG. 3, the transaction T100 is composed of a function tier T102, a process tier T104, a service tier T106, an information tier T108, an application tier T110, and a resource tier T112.

The transaction T100, examples of which include a business process, is a long-term transaction (global transaction) obtained by serializing a plurality of processes. Examples of the function tier T102 include a user interface (UI) and management tools.

The process tier T104, examples of which include a workflow of a business process for realizing a function of the function tier T102, defines the transaction T100. In addition, the process tier T104 executes the transaction T100 by serializing and calling a plurality of services provided by the service tier T106 according to characteristics unique to the transaction The service tier T106 provides the services, and at the same time, maintains security by managing whether or not a given process is allowed to access a specific service or the like.

Note that each of tiers lower than the service tier T106 is subjected to distribution.

The information tier T108 is a middleware tier for providing information necessary for the service of the service tier T106 by coupling a function provided to the application tier T110, which is executed by the transaction T100, to a predetermined output.

Examples of the resource tier T112 include a database.

Association of Nodes with a Transaction

Figure 8:
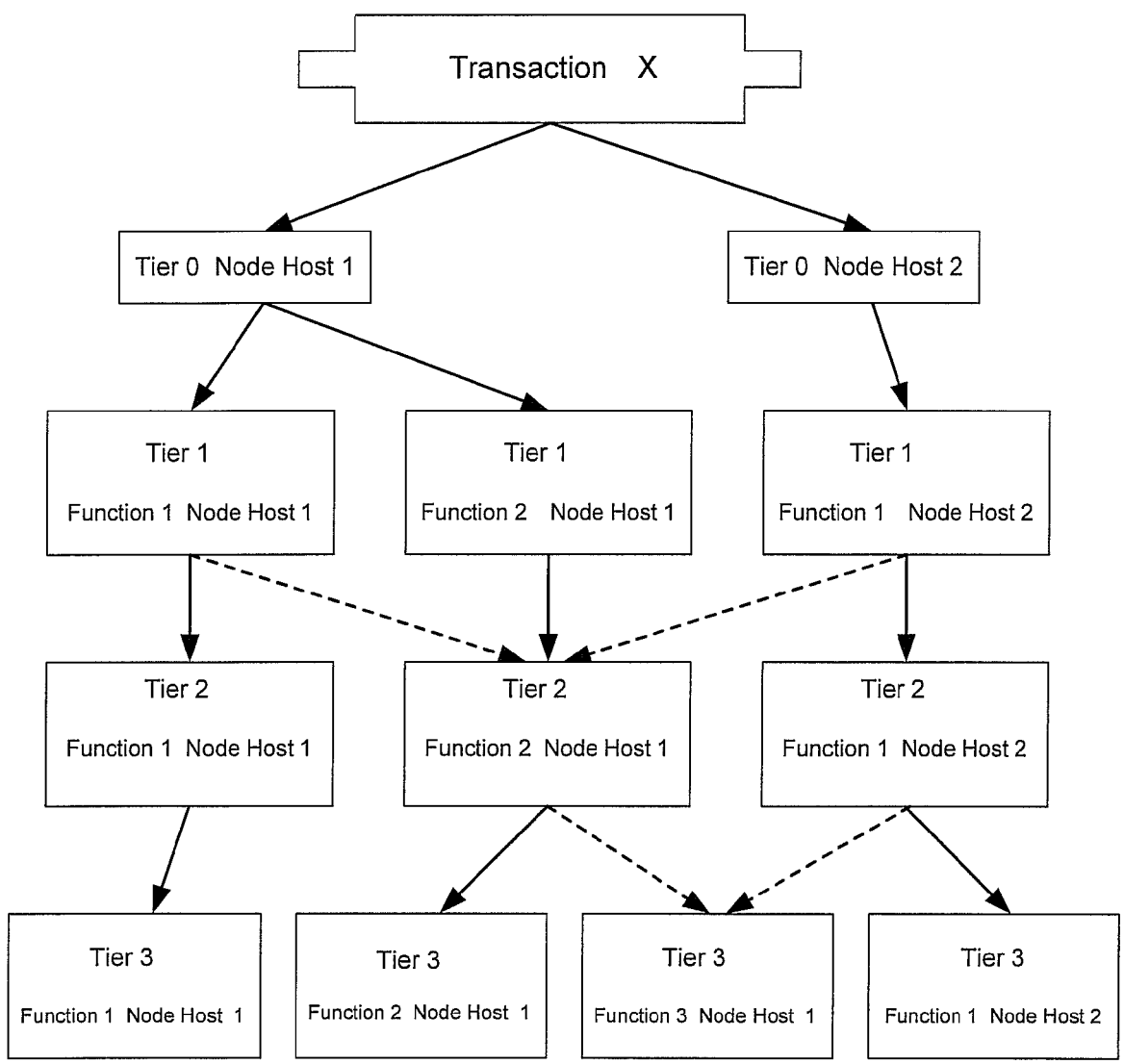
FIG. 8 is a conceptual diagram exemplifying association of nodes with a transaction.

FIG. 8 is a conceptual diagram exemplifying association of nodes with a transaction.

As shown in FIG. 8, a transaction X is divided into, for example, a plurality of tiers (0 to 3). The multi-tier distributed system 1 confirms relationships between the transaction X and a node of each tier by specifying the number of the node or the like on a tier basis according to a node host name and a function (based on a port number) with respect to the transaction X.

The dotted line indicates a possible read-only shared node or a possible shared node to which data can be written by characteristics of a function.

Structure of Tier1 Node Host 3, Tier2 Node Host 4, and Tier3 Node Host 5

Figure 4:
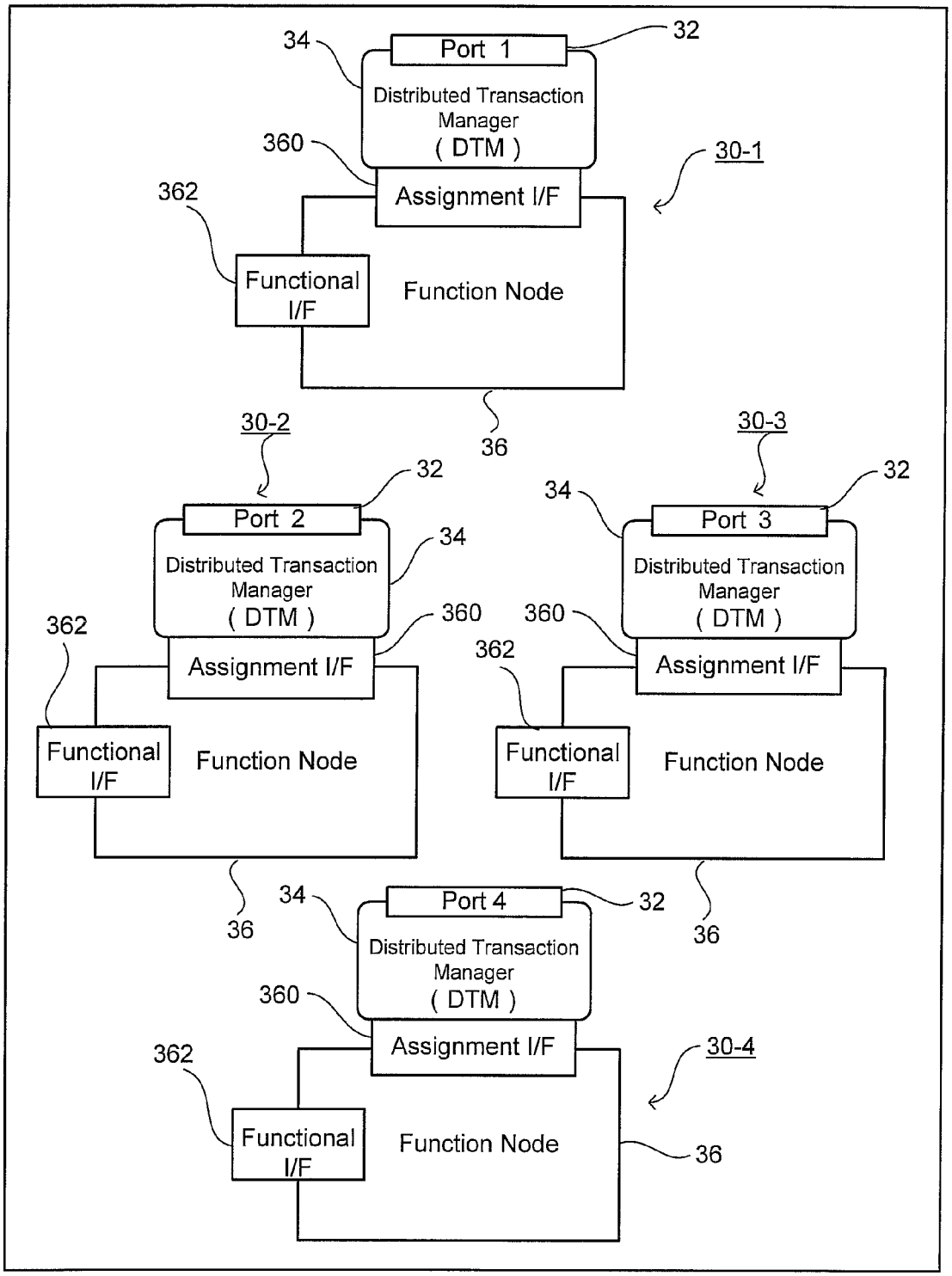
FIG. 4 is a diagram exemplifying a structure of the Tier1 node host, the Tier2 node host, and the Tier3 node host.

FIG. 4 is a diagram exemplifying a structure of the Tier1 node host 3, the Tier2 node host 4, and the Tier3 node host 5. As shown in FIG. 4, the Tier1 node host 3, the Tier2 node host 4, and the Tier3 node host 5 have similar structures each and includes, for example, 4 nodes 30-1 to 30-4.

The nodes 30-1 to 30-4 execute the same function or different functions at an equivalent level on a tier basis at each of the predetermined tiers of a transaction.

Note that the number of nodes 30 included in the Tier1 node host 3, the Tier2 node host 4, and the Tier3 node host 5 is not limited to 4, and may include mutually-different number of nodes 30.

The nodes 30-1 to 30-4 are each composed of a node port 32 having a value different from another, a distributed transaction manager (DTM) 34, and a function node 36. The node port 32 is a unique port number corresponding to a function unique to each of the nodes 30-1 to 30-4. The distributed transaction manager 34 has information for managing each node 30 (described later by using FIG. 5), and calls the function node 36 of another node 30 to be coupled thereto via the node port 32.

Note that in the transaction T100, the distributed transaction managers 34 are used to execute processes from the service tier T106 to the resource tier T112.

The function node 36 is a service execution section for executing the same service or different services at an equivalent level on a tier basis at each of the predetermined tiers of a transaction, and is implemented with an assignment interface (I/F) 360 and a functional interface (I/F) 362. The assignment I/F 360 is an interface to be used when the function node 36 is called by a method via the node port 32 by the distributed transaction manager 34 of another node 30.

When a required function that needs to be assigned is called, the assignment I/F 360 is configured to return, for example, true if a function that can be provided by the function node 36 matches the necessary function.

For instance, in a case where the node 30 is shareable, the assignment I/F 360 is configured to return, for example, true.

The functional I/F 362 is an interface to be used when the function node 36 inputs/outputs a service.

Structure of Distributed Transaction Manager 34

Next, a structure of the distributed transaction manager 34 will be described in detail.

Figure 5:
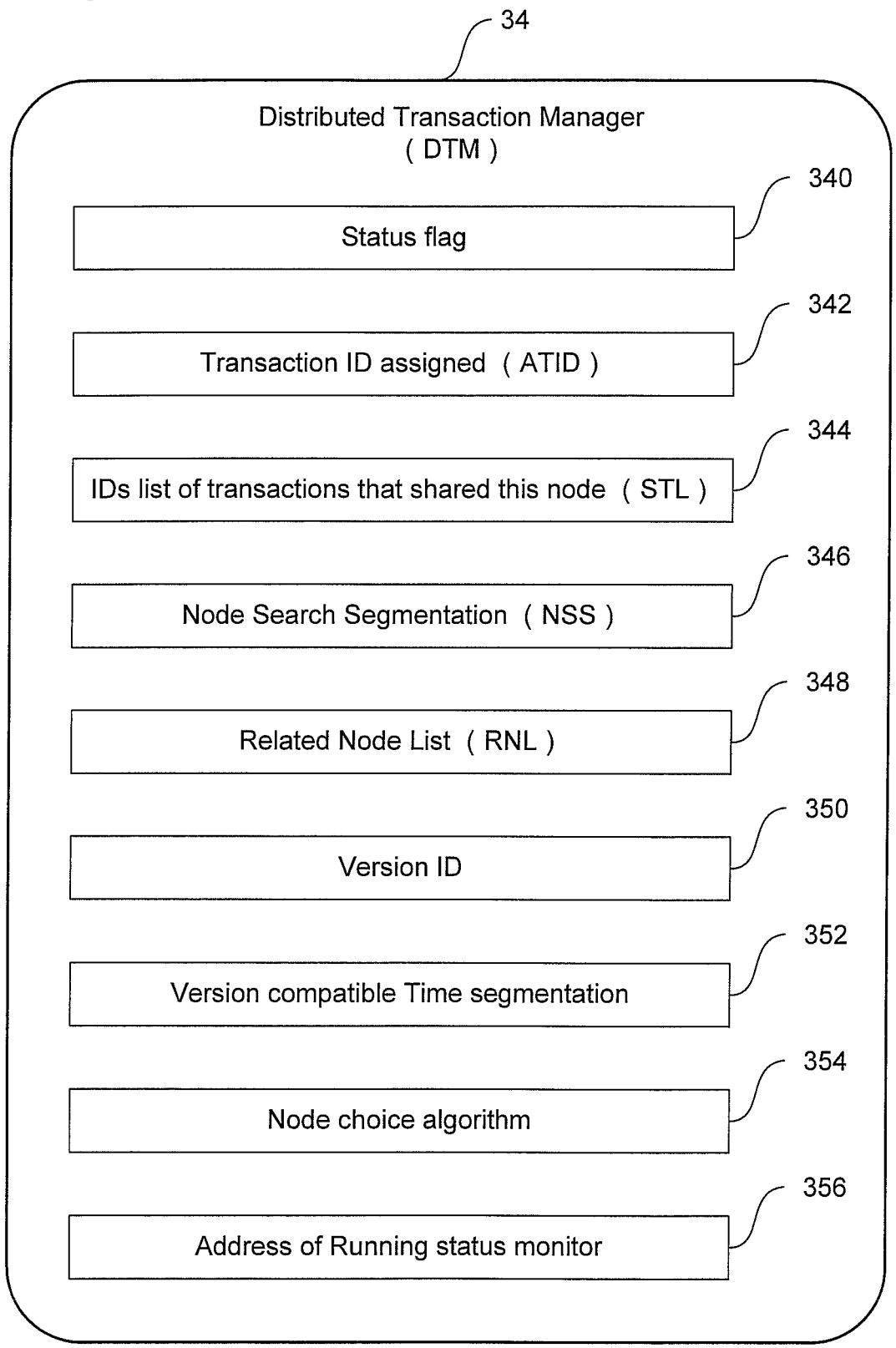
FIG. 5 is a diagram showing a structure of a distributed transaction manager.

FIG. 5 is a diagram showing the structure of the distributed transaction manager 34. As shown in FIG. 5, the distributed transaction manager 34 includes a status flag 340, a transaction ID assigned (specified) 342, a shared transaction ID list 344, a node search segmentation 346, a related node list 348, a version ID 350, a version compatible time segmentation 352, a node choice algorithm 354, and an address of running status monitor 356.

The status flag 340 is a flag indicating a status in which an own node 30 is used by an upper-tier node 30, and indicates one of values representing the following three statuses.

Free: the own node 30 is freed from the upper-tier node 30.

Assigned: the own node 30 is used (including exclusive use) by the upper-tier node 30.

Shared: the own node 30 is shared by a plurality of upper-tier nodes 30 with respect to one or more transactions.

The transaction ID assigned (ATID) 342 is a component that stores a transaction ID for specifying a transaction to which the own node 30 is assigned if the status flag 340 is set to "Assigned".

Note that the transaction ID is composed of, for example, a node host address (IP address or host name) of the Tier1 node host 3 or the like, that executes the processing of the process tier T104 and a node ID (process ID).

The shared transaction ID list (STL) 344 is a component that stores transaction IDs of transactions sharing the own node 30 in a shared list if the status flag 340 is set to "Shared".

The node search segmentation (NSS) 346 has an address for specifying one of node hosts and a segmentation list (not shown) containing one or more combinations of the node 30 and the port number, and constitutes a special communication channel for performing information exchange with respect to each distributed transaction manager 34 and performing assignment of the node 30.

For example, the node search segmentation 346 uses the segmentation list to search for the lower-tier nodes 30 that are available.

The segmentation list may be, for example, a combination of the IP address of a node host that declares the start and the end of a transaction and the port number of the node port 32, and may be a list of node host names using a wild card or a list of node host names.

For example, in a case of structuring the node search segmentation by the IP address and the node port, the following structure is obtained.

192.168.0.10 to 20 and their respective ports 100 to 200, and 192.168.0.21 to 30 and their respective ports 120 to 200

Alternatively, in a case of structuring the node search segmentation by the list of node host names using a wild card or the list of node host names, the following structure is obtained.

host1 to host20 and their respective ports 110 to 120, and
host3? to host5? and their respective ports 200 to 300

Herein, "host3?" means host30 to host39, host3a to host3z, and the like.

The related node list (RNL) 348 is a component that stores a node list of the lower-tier nodes 30 used by the own node 30. The node list is arranged in an order of committing the nodes 30, and holds the address of the node host and the node port 32.

The version ID 350 is a component that stores an ID indicating a version of a function of the function node 36 of the own node 30.

The version compatible time segmentation 352 is a component that stores information for segmenting the version of the function of the function node 36 based on a timestamp and segmenting a transaction that can share the own node 30. For example, the version compatible time segmentation 352 includes a pair of a start time and an end time of a transaction. In addition, the version compatible time segmentation 352 sets the segmentation to be unlimited in a case where the time of both or one of the start and the end of a transaction is null.

The node choice algorithm 354 is a component that stores an algorithm describing how to choose one node 30 from a plurality of lower-tier nodes 30 that have the same function and are not being used.

The address of running status monitor 356 is a component that stores an address for allowing the management assistant 2 to monitor a running status of the node 30.

Assignment of Nodes 30 with Respect to Transactions

Next, a description will be made of assignment of the nodes 30 with respect to transactions.

Figure 6:
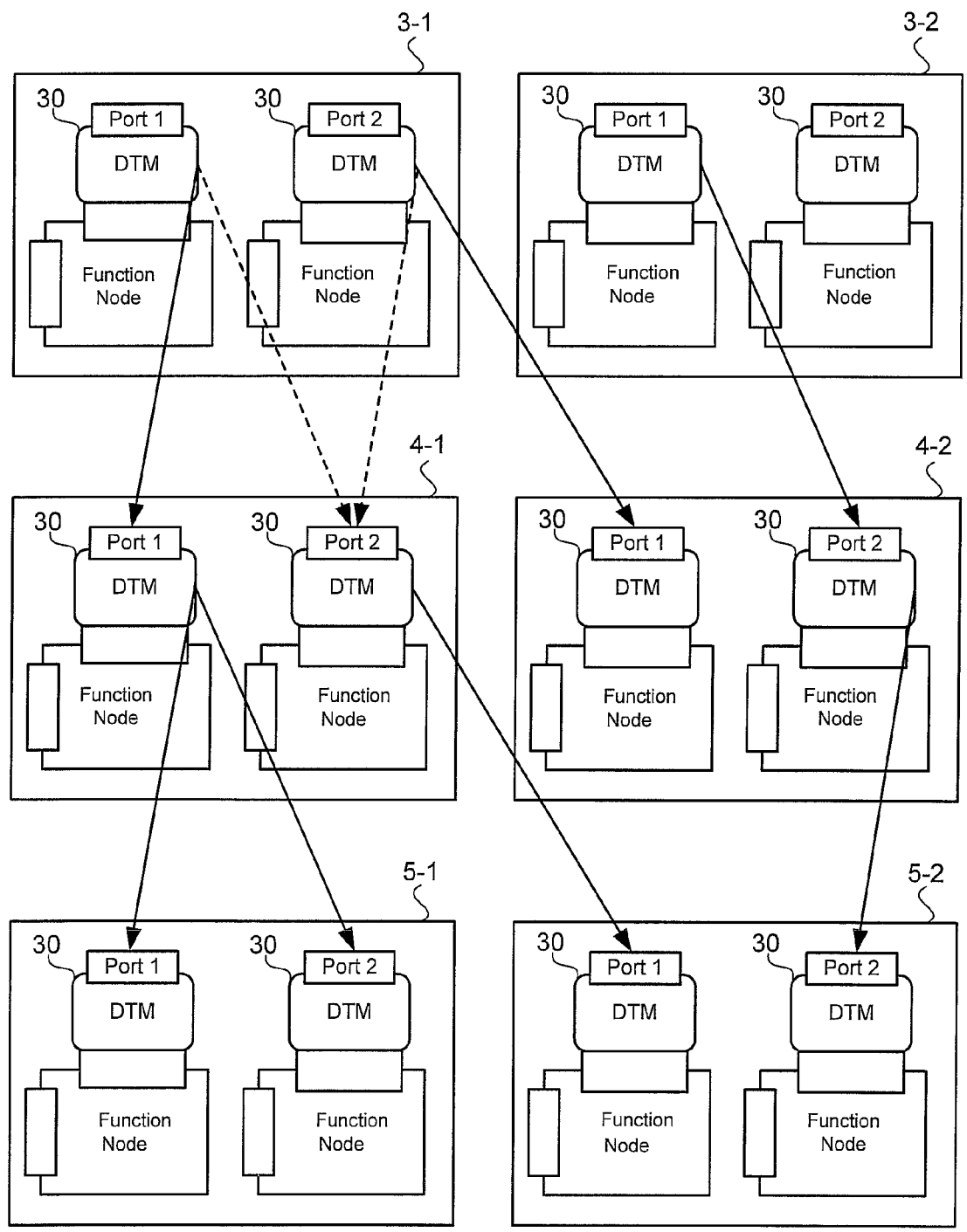
FIG. 6 is a diagram exemplifying assignment of nodes with respect to a plurality of transactions.

FIG. 6 is a diagram exemplifying assignment of the nodes 30 with respect to a plurality of transactions.

Note that FIG. 6 exemplifies a case where the Tier1 node hosts 3-1 and 3-2, the Tier2 node hosts 4-1 and 4-2, and the Tier3 node hosts 5-1 and 5-2 each have two nodes 30.

As indicated by the solid arrows, the node 30 assigns (exclusively uses) the lower-tier node 30 to a predetermined transaction. In addition, as indicated by the dotted arrows, the node 30 shares the lower-tier node 30 with another node 30 with respect to a predetermined transaction. However, the node 30 shared by the plurality of nodes 30 is a read-only shared node or a shared node to which data can also be written by characteristics of a function.

In addition, the node 30 may be shared by a plurality of nodes 30 in a case where sharing is approved based on the information exchanged with respect to another node 30.

As described above, in a case of starting a new transaction, each of the nodes 30 searches a lower tier for the node 30 that is not being used, and assigns the node 30 to the new transaction. Then, the Tier1 node host 3, the Tier2 node host 4, and the Tier3 node host 5 use the distributed transaction managers 34 to confirm and store which transaction their respective nodes 30 used or have not used with respect thereto.

Management Assistant (Manage Assistant) 2

Next, the management assistant 2 will be described in detail.

As described above, the management assistant 2 is a component for supporting the administrator of the multi-tier distributed system 1, and performs the following supports to the administrator.

monitoring execution of a transaction by the multi-tier distributed system 1 changing the structure of the multi-tier distributed system 1 in order to improve performance of the multi-tier distributed system 1 updating the function node 36.

Figure 7:
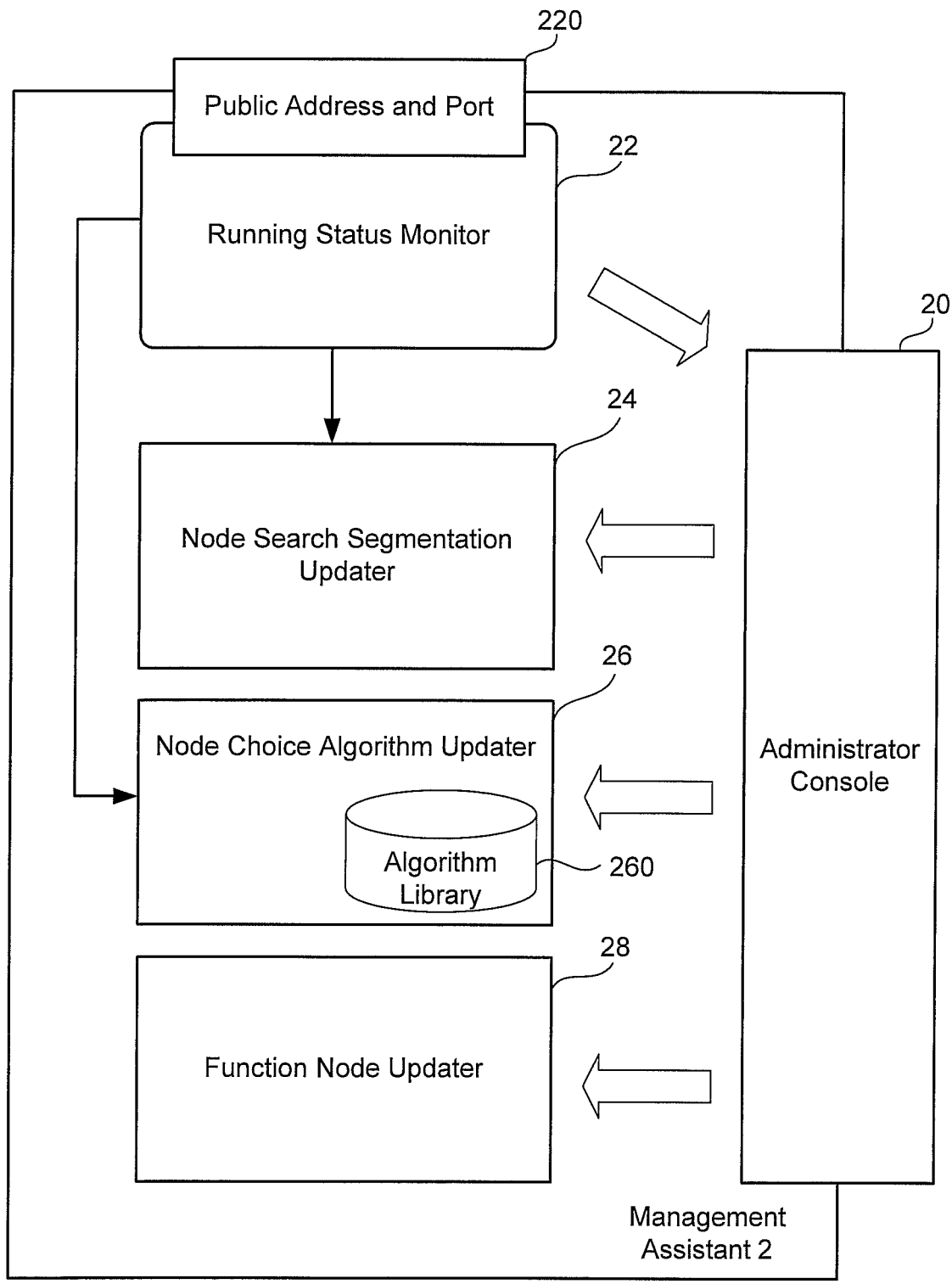
FIG. 7 is a diagram showing a structure of the management assistant.

FIG. 7 is a diagram showing a structure of the management assistant 2. As shown in FIG. 7, the management assistant 2 includes an administrator console 20, a running status monitor 22, a node search segmentation updater 24, a node choice algorithm updater 26, and a function node updater 28.

The administrator console 20 is a user interface (UI) for the administrator.

The running status monitor 22 has a public address and port 220, collects running statuses of the sections composing the multi-tier distributed system 1, and reports the resultant to the administrator. The public address and port 220 is known to the respective distributed transaction managers 34 of the Tier1 node host 3, the Tier2 node host 4, and the Tier3 node host 5. That is, by having the respective distributed transaction managers 34 transmit the running statuses with the public address and port 220 set as a destination, the running status monitor 22 can collect the respective running statuses of the Tier1 node host 3, the Tier2 node host 4, and the Tier3 node host 5.

When the status of the multi-tier distributed system 1 becomes a status predefined by the administrator, the node search segmentation updater 24 broadcasts, to all of the distributed transaction managers 34, node search segmentation update information for allowing the node 30 to search for the lower-tier nodes 30. Examples of the status predefined by the administrator include a status in which the number of hosts that have become unable to be used or the number of hosts that have newly added exceeds a set number in a given segmentation.

The broadcasting of the node search segmentation update information serves to improve the performance of the multi-tier distributed system 1, and even if the node search segmentation update information is not broadcasted, the respective distributed transaction managers 34 are configured to be able to find a free node 30 from the segmentation structured to be sufficiently wide.

The node choice algorithm updater 26 has an algorithm library 260 that holds all of the execution packages, and when the status of the multi-tier distributed system 1 becomes the status predefined by the administrator, in order to improve the performance, transmits the execution package of a node choice algorithm to the respective distributed transaction managers 34.

Examples of the node choice algorithm include an algorithm for setting the same node 30 to keep being used by use of a cache.

For example, description will be made of an algorithm for choosing a node shortest in response time. That is, it is assumed that there are three lower-tier nodes that are managed by a given node, and that two thereof become unable to be used due to some cause. The node choice algorithm updater 26 transmits to the given node an easier algorithm for setting the same node 30 to keep being used. The given node replaces and executes the transmitted algorithm. As a result, one available lower-tier node is selected, and the lower-tier nodes that cannot be used are not accessed, which allows the overall performance to be improved.

Note that means including means for updating a node search segmentation and means for updating a node choice algorithm will be referred to as node updating means.

According to an instruction from the administrator through the administrator console 20 or the like, the function node updater 28 updates the function node 36 of the node 30 to a new version, and changes the version ID 350 of the distributed transaction manager 34.

Execution of Transaction by Multi-Tier Distributed System 1: Workflow

Next, description will be made of execution of a transaction by the multi-tier distributed system 1.

Figure 9:
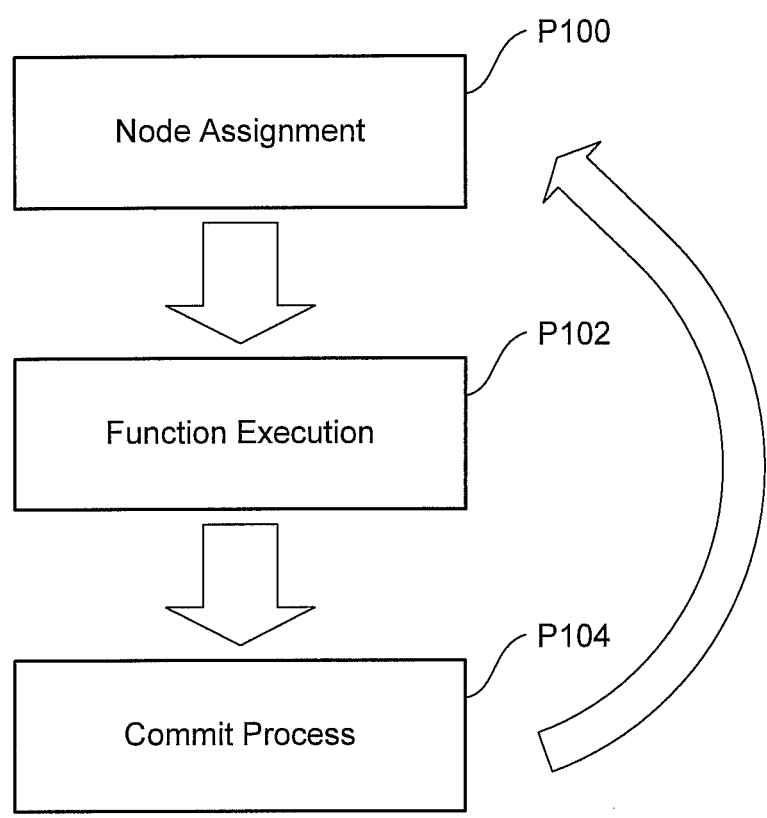
FIG. 9 is a diagram showing a cycle of executing a transaction by the multi-tier distributed system.

FIG. 9 is a diagram showing a cycle of executing a transaction by the multi-tier distributed system 1.

As shown in FIG. 9, the multi-tier distributed system 1 executes a transaction by using a node assignment phase (P100), a function execution phase (P102), and a commit process phase (P104).

In the node assignment phase (P100), for example, the management assistant 2 groups addresses of the Tier1 node host 3, the Tier2 node host 4, the Tier3 node host 5, and the like. For example, to group the node hosts by the IP address, the IP addresses are divided as follows.

information tier: 192.168.0.10 to 69
application tier: 192.168.0.70 to 159
resource tier: 192.168.0.160 to 250.

Alternatively, to group the node hosts by the node host name, the IP addresses are divided as follows.

information tier: infohost1 to infohost20
application tier: applihost1 to applihost50
resource tier: resourcehost1 to resourcehost80.

Each of the nodes 30 uses the distributed transaction manager 34 to search for the lower-tier nodes 30 having a function necessary for a transaction, and selects a node 30 that is not used in a predetermined address and port segmentation at a lower tier.

In the function execution phase (P102), the transaction is executed by being coupled with the necessary function of the node 30.

In the commit process phase (P104), each of the nodes 30 performs two stages of processes.

First, as a preparatory process, the node 30 confirms that a tree of all of the distributed transaction managers 34 for the transaction to be ended has been brought to a preparatory status.

Subsequently, the transaction is again committed by each of the nodes 30, and if the transaction fails, rollback is performed.

Attribute Management of Distributed Transaction Manager 34

Figure 10:
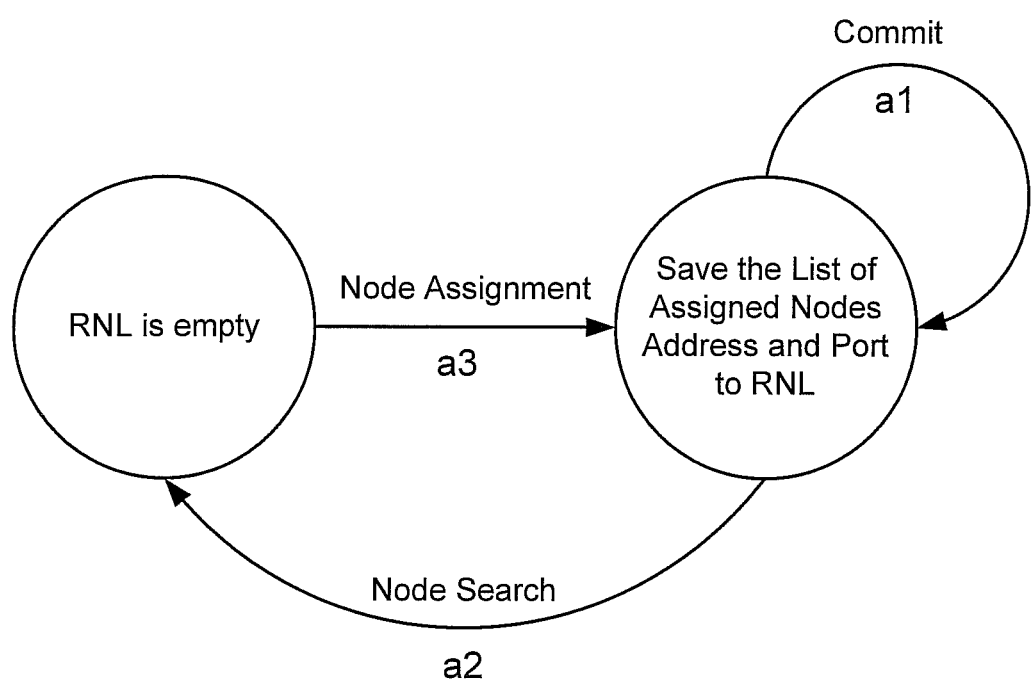
FIG. 10 is a status transition diagram of a related node list managed by the distributed transaction manager.

FIG. 10 is a status transition diagram of the related node list 348 managed by the distributed transaction manager 34.

The related node list 348 holds a node list (the address of the node host and the node port 32) of the lower-tier nodes 30 used by the own node 30 as described above.

Even if a new transaction is started after the transaction is committed, the distributed transaction manager 34 does not shift from a status in which the node list is stored in the related node list 348 (a1). That is, even if the transaction is committed, the related node list 348 is not cleared immediately.

When a new transaction is started, the distributed transaction manager 34 accesses the node 30 included in the related node list 348 before the addresses are segmented. That is, the distributed transaction manager 34 first searches for the nodes 30 stored in the related node list 348, and assigns the lower-tier node 30 to the new transaction.

When the node 30 included in the related node list 348 is accessed, the distributed transaction manager 34 shifts from the status in which the node list is stored in the related node list 348 to a status in which the related node list 348 is empty (node search: a2).

When the lower-tier node 30 is assigned to the function requested by the node 30, the address of the node host of the new node 30 and the node port 32 are added to the node list, and the related node list 348 shifts from the status of being empty to the status of storing the node list (a3).

Figure 11:
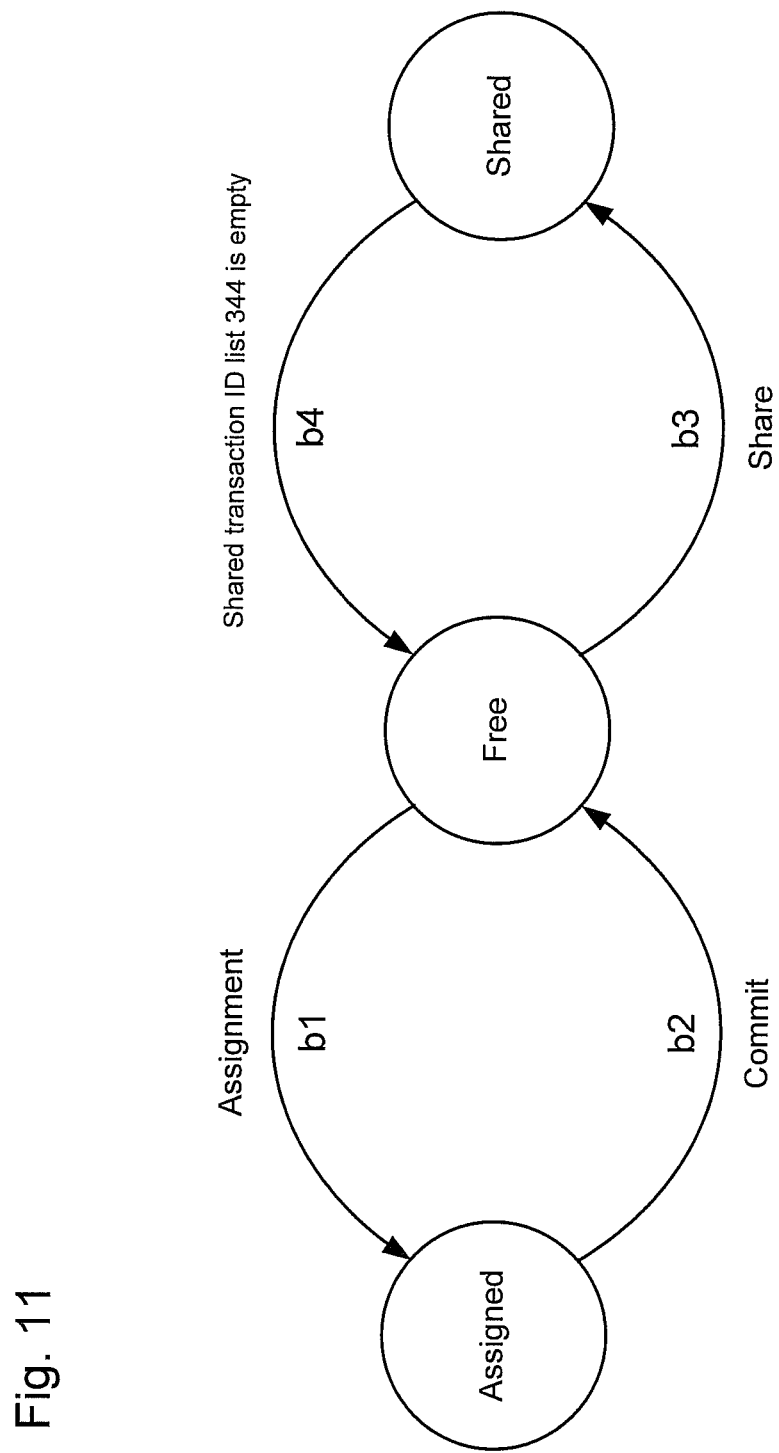
FIG. 11 is a status transition diagram showing a running status of the distributed transaction manager.

FIG. 11 is a status transition diagram showing the running status of the distributed transaction manager 34.

When the own node 30 is assigned to a transaction, the distributed transaction manager 34 shifts from a free status to an assigned status (b1).

Further, when the transaction is committed, the distributed transaction manager 34 shifts from the assigned status to the free status (b2).

Further, when the own node 30 is shared with respect to the transaction, the distributed transaction manager 34 shifts from the free status to a shared status (b3).

Further, when the shared transaction ID list 344 becomes empty, the distributed transaction manager 34 shifts from the shared status to the free status (b4).

Search in Node Assignment Phase (P100)

Figure 12:
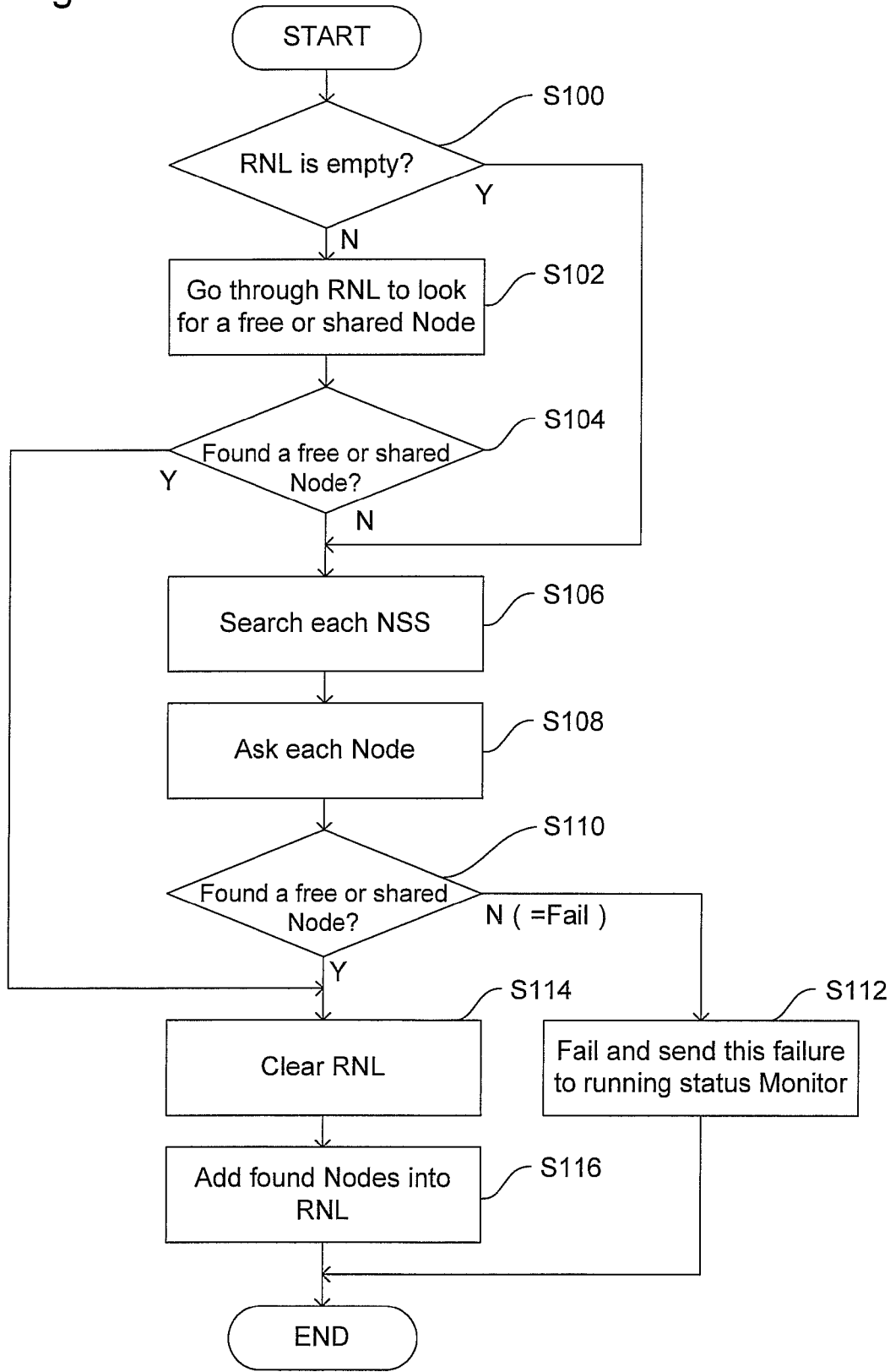
FIG. 12 is a flowchart showing a processing (S10) of searching for, by each of distributed transaction managers of each node, lower-tier nodes with respect to one or more requested transactions in a node assignment phase.

FIG. 12 is a flowchart showing a processing (S10) of searching for, by each of the distributed transaction managers 34 of each node 30, the lower-tier nodes 30 with respect to one or more requested transactions in the node assignment phase (P100).

As shown in FIG. 12, in Step 100 (S100), the distributed transaction manager 34 confirms whether or not the related node list 348 is empty, and advances to Step S106 if the related node list 348 is empty and advances to Step S102 if the related node list 348 is not empty.

In Step 102 (S102), the distributed transaction manager 34 goes through the related node list 348 to look for a shared node or a free node 30 that has a necessary function at a lower tier.

In Step 104 (S104), the distributed transaction manager 34 advances to Step S114 if the node 30 having the necessary function that can be assigned is found, and advances to Step S106 if not found.

In Step 106 (S106), the distributed transaction manager 34 starts searching through each node search segmentation 346 for an available node 30.

In Step 108 (S108), the distributed transaction manager 34 starts searching for the available node 30 by inquiring about the running status from each of the nodes 30. (confirming the running status)

In Step 110 (S110), the distributed transaction manager 34 advances to Step S114 if the node 30 having the necessary function that can be assigned is found, and advances to Step S112 if not found (if fails).

In Step 112 (S112), the distributed transaction manager 34 transmits a signal (failure) indicating that the node 30 is not found to the running status monitor 22 of the management assistant 2.

In Step 114 (S114), the distributed transaction manager 34 clears the related node list 348.

In Step 116 (S116), the distributed transaction manager 34 adds the found node 30 to the related node list 348.

Assignment in Node Assignment Phase (P100)

Figure 13:
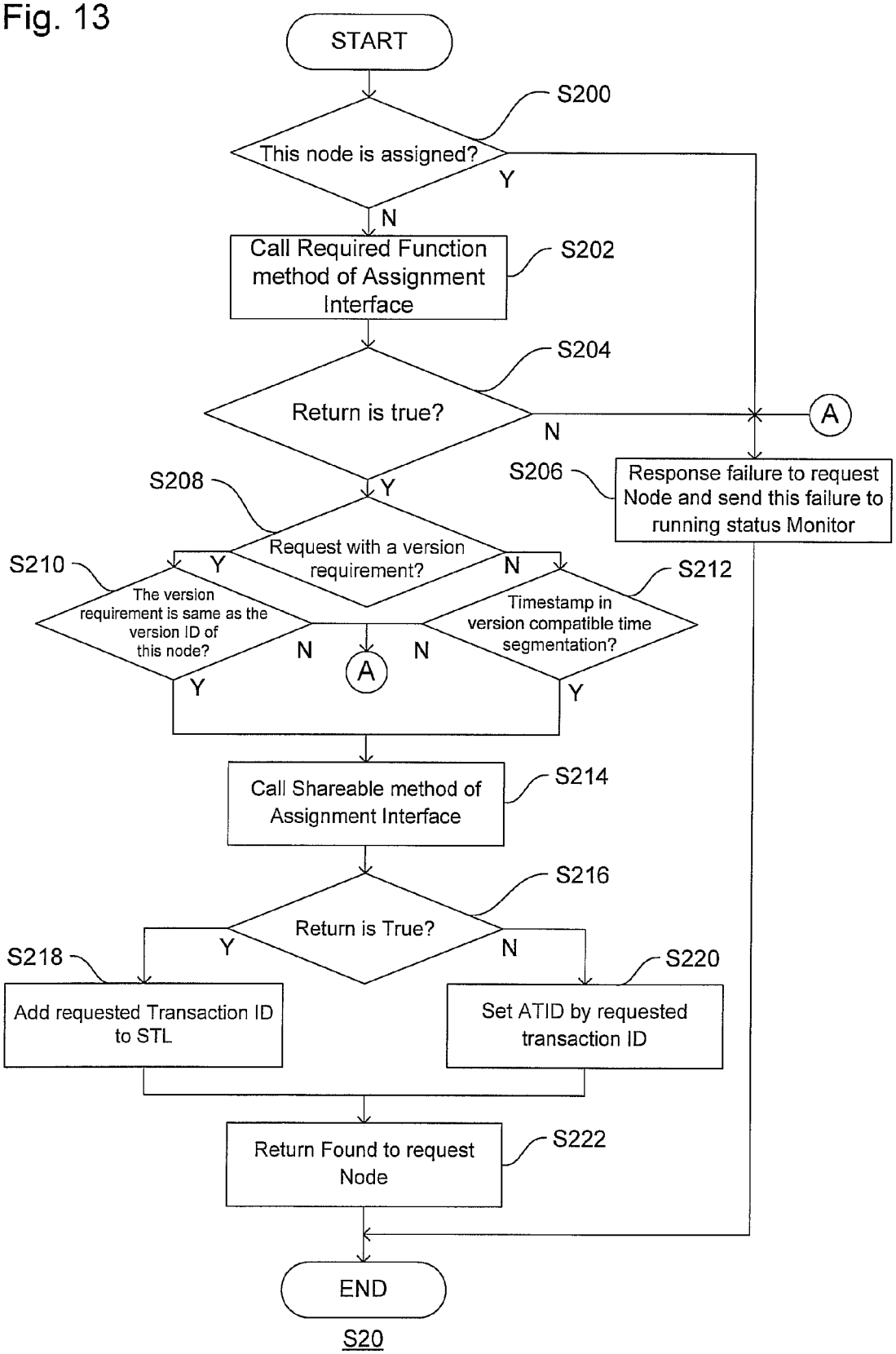
FIG. 13 is a flowchart showing a processing (S20) of assigning, by each of the distributed transaction managers of each node, the node to the one or more requested transactions in the node assignment phase.

FIG. 13 is a flowchart showing a processing (S20) of assigning, by each of the distributed transaction managers 34 of each node 30, the node to the one or more requested transactions in the node assignment phase (P100).

As shown in FIG. 13, in Step 200 (S200), the distributed transaction manager 34 judges whether or not the own node 30 at a lower tier is assigned by an upper-tier node 30, and advances to Step S206 if assigned and advances to Step S202 if freed.

In Step 202 (S202), the upper-tier node 30 calls a method for the assignment I/F 360 of the function node 36 having a function required by the transaction.

In Step 204 (S204), the upper-tier node 30 judges whether or not the return from the lower-tier node 30 is true (the required function), and advances to Step S208 if the return is true and advances to Step S206 if the return is not true.

In Step 206 (S206), the lower-tier node 30 transmits information indicating failure to the upper-tier node 30 that has requested the function and the running status monitor 22.

In Step 208 (S208), the upper-tier node 30 judges whether or not there is a request with a version requirement for the function of the transaction, and advances to Step S210 if there is a request and advances to Step S212 if there is no request.

In Step 210 (S210), the upper-tier node 30 judges whether or not the version requirement for a function at the lower tier is the same as the version ID stored in the version ID 350 at the lower tier, and advances to Step S214 if the same and advances to Step S206 if not the same.

In Step 212 (S212), the upper-tier node 30 references a timestamp included in the version compatible time segmentation 352 at the lower tier to judge whether or not the timestamp indicates that the function at the lower tier is a shareable version, and advances to Step S214 if the shareable version is indicated and advances to Step S206 if a version that cannot be shared is indicated.

In Step 214 (S214), the upper-tier node 30 calls a method for the assignment I/F 360 of the lower-tier node 30 having a shareable function.

In Step 216 (S216), the upper-tier node 30 judges whether or not the return from the lower-tier node 30 is true (shareable), and advances to Step S218 if the return is true and advances to Step S220 if the return is not true.

In Step 218 (S218), the lower-tier node 30 adds the transaction ID to the shared transaction ID list 344.

In Step 220 (S220), the lower-tier node 30 sets the transaction ID assigned 342 by the transaction ID.

In Step 222 (S222), the lower-tier node 30 returns information indicating that the available node 30 has been found to the upper-tier node 30 that has requested the function.

Note that in the case where the upper-tier node 30 requests a function from the lower-tier node 30, the following implementation is recommended.

Approach Using an ID
  class name or JavaBeans name (registered trademark) in a
    Java (registered trademark) environment
  DCOM name or ID in a DCOM (registered trademark)
    environment
Approach Using a Description
  function type
    data access, business logic, or the like
  function subtype
    table name with respect to data access
    business step with respect to a business logic
  operational attribute
    insertion/choice/update of a table with respect to data
      access
Version Management of Node 30

Next, version management of the node 30 will be described in detail.

In a case where the administrator sets a version of the node 30 to be updated through the administrator console 20, the multi-tier distributed system 1 causes the management assistant 2 to update the version of the node 30.

The management assistant 2 controls how many nodes 30 update or keep which version.

For example, the management assistant 2 updates all of the nodes 30 of the Tier1 node host 3-1 to the last version.

Alternatively, the management assistant 2, for example, may keep three nodes 30 at Version 1, keep five nodes 30 at Version 2, and update the other nodes 30 to the last version, or may keep 10% of nodes 30 at Version 1, keep 20% of nodes 30 at Version 2, and update the other nodes 30 to the last version.

In addition, the management assistant 2 performs segmentation based on the timestamp with respect to the nodes 30 of a predetermined version.

Figure 14:
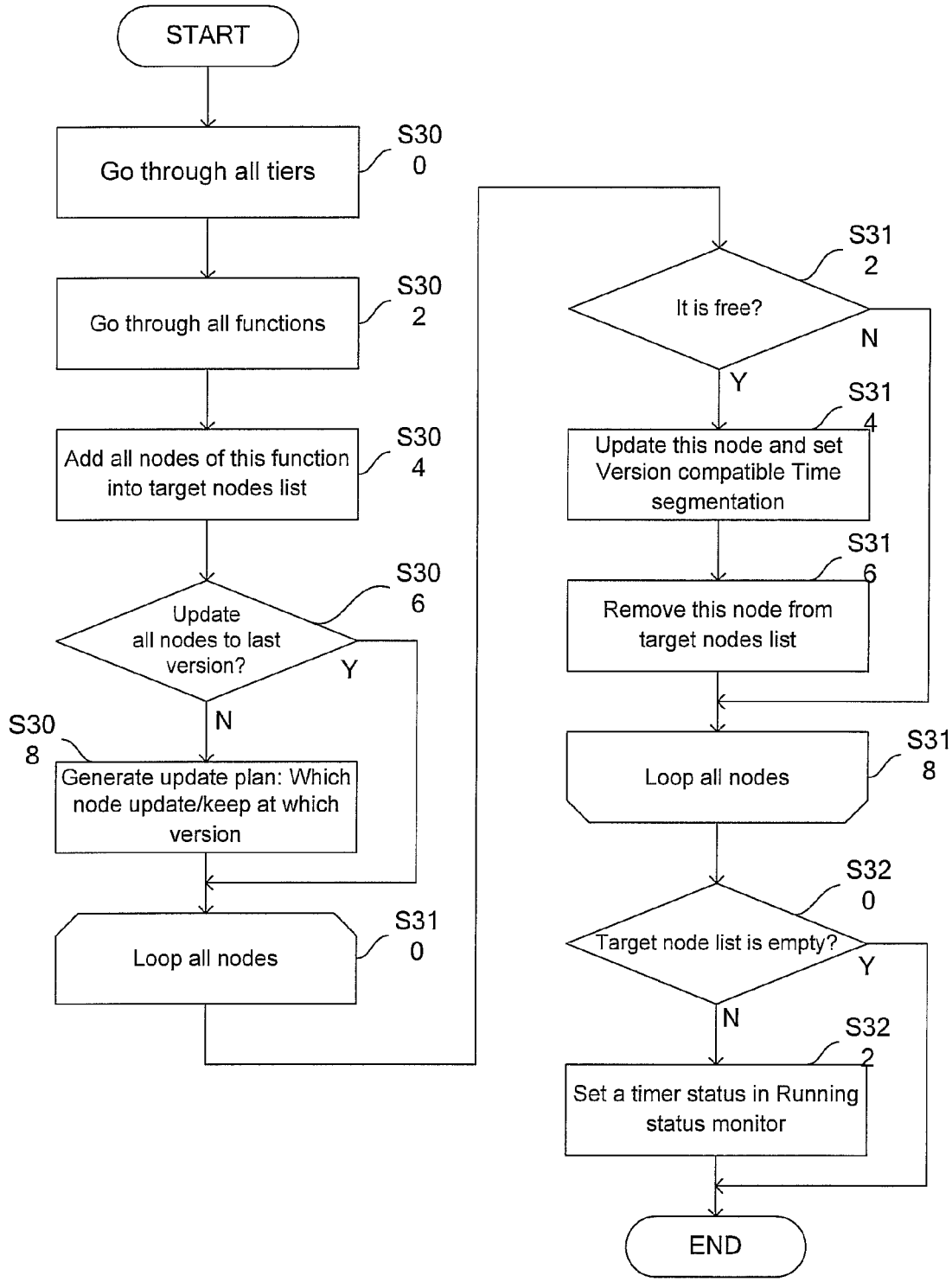
FIG. 14 is a flowchart exemplifying a processing (S30) of managing a version of a node by the management assistant.

FIG. 14 is a flowchart exemplifying a processing (S30) of managing the version of the node 30 by the management assistant 20.

As shown in FIG. 14, in Step 300 (S300), the management assistant 2 starts searching for the nodes 30 at each tier.

In Step 302 (S302), the management assistant 2 confirms the functions of the respective nodes 30.

In Step 304 (S304), the management assistant 2 adds all of the nodes 30 that have a predetermined function to the node list to be a target for the transaction.

In Step 306 (S306), for example, according to the instruction which is input by the administrator through the administrator console 20, the management assistant 2 judges whether or not all of the nodes 30 that have the predetermined function are to be updated to the last version, and advances to Step S310 if the version of all of the nodes 30 are to be updated, and advances to Step S308 if some of the nodes 30 that have the predetermined function are to be selected to have the version updated.

In Step 308 (S308), for example, according to the instruction inputted by the administrator through the administrator console 20, the management assistant 2 generates, for each of the nodes 30, a version update plan indicating which node 30 is to be updated to/kept at which version.

In Step 310 (S310), the management assistant 2 starts a loop for confirmation of a node.

In the loop for confirmation of a node, steps up to Step S318 described later are repeated for the individual nodes 30 from a time when a variable N starts with a value of 1 and increments by 1 until the variable N becomes the number of nodes.

In Step 312 (S312), the management assistant 2 judges whether or not the node 30 is being used, and advances to Step S314 if being used and advances to Step S318 if not being used.

In Step 314 (S314), the management assistant 2 updates the node 30 and sets the version compatible time segmentation.

In Step 316 (S316), the management assistant 2 removes, from the node list to be the target, the node 30 that has been updated and has had the version compatible time segmentation set in Step S314.

In Step 318 (S318), the management assistant 2 ends the loop for confirmation of a node if conditions indicated in Step S310 are satisfied.

In Step 320 (S320), the management assistant 2 judges whether or not the node list to be the target becomes empty, and advances to Step S322 if not empty and ends the processing if empty.

In Step 322 (S322), the management assistant 2 sets a timer status in the running status monitor 22 so as to perform the processing S30 later again.

Consequently, the multi-tier distributed system 1 can assign the nodes 30 of different versions according to the kind of transaction, and within one system, the nodes 30 of a plurality of versions can perform execution with respect to a plurality of different transactions.

DESCRIPTION OF REFERENCE SYMBOLS

1 . . . multi-tier distributed system
10 . . . network
T100 . . . transaction
T102 . . . function tier
T104 . . . process tier
T106 . . . service tier
T108 . . . information tier
T110 . . . application tier
T112 . . . resource tier
2 . . . management assistant
20 . . . administrator console
22 . . . running status monitor
220 . . . public address and port
24 . . . node search segmentation updater
26 . . . node choice algorithm updater
260 . . . algorithm library
28 . . . function node updater
3-1,3-2 . . . . Tier1 node hosts
30-1~30-4 . . . node
32 . . . node port
34 . . . distributed transaction manager
340 . . . status flag
342 . . . transaction ID assigned
344 . . . shared transaction ID list
346 . . . node search segmentation
348 . . . related node list
350 . . . version ID
352 . . . version compatible time segmentation
354 . . . node choice algorithm
356 . . . address of running status monitor
36 . . . function node
360 . . . assignment I/F
362 . . . functional I/F
4-1,4-2 . . . . Tier2 node hosts
5-1,5-2 . . . . Tier3 node hosts
60 . . . main body
600 . . . CPU
602 . . . memory
62 . . . input-output apparatus
64 . . . communication apparatus
66 . . . storage apparatus

INDUSTRIAL APPLICABILITY

The present invention can be used as a multi-tier distributed system that executes a transaction by dividing the transaction into predetermined two or more tiers.

The invention claimed is:

1. A multi-tier distributed system comprising:
an upper node belonging to an upper tier of the multi-tier distributed system; and
a lower node belonging to a lower tier of the multi-tier distributed system, wherein a transaction is divided between the upper node and the lower node,
the upper node including monitoring means for monitoring a running status of the lower node with respect to the transaction,
the lower node including:
monitor enabling means for allowing the upper node to monitor the running status of the lower node; and
a function section for providing the upper node with a service via the monitor enabling means according to the running status,
wherein the transaction is executed by both the upper node and the lower node based on the service.

2. A multi-tier distributed system according to claim 1, wherein:
the upper node further includes a first communication means for monitoring the lower node; and
the lower node further includes a second communication means for providing the upper node with the service.

3. A multi-tier distributed system according to claim 1, wherein:

the upper node further includes node specifying means for specifying the lower node based on information unique to the lower node and the running status monitored via the monitoring means; and the specified lower node provides the upper node with the service.

4. A multi-tier distributed system according to claim 3, wherein the lower node further includes means for transmitting information having the lower node specified according to the running status and an attribute of the function section of the lower node in response to a request made by the upper node.

5. A multi-tier distributed system according to claim 4, wherein the lower node further includes:
storage means for storing the information having the lower node specified; and
update means for dynamically updating the information for having the lower node specified.

6. A multi-tier distributed system according to claim 3, further comprising:
version limiting means for limiting a version of one or more function sections according to the transaction; and
control means for controlling the node specifying means to specify the lower node having the function section of the version limited by the version limiting means.

7. A multi-tier distributed system according to claim 6, wherein a plurality of the nodes each having the function section different in version from another are included in the same tier.

8. A multi-tier distributed system according to claim 1, further comprising a management assistant including:
means for collecting use statuses of the upper and lower nodes; and
means for controlling the functions of the upper and lower nodes with respect to a specific status.

9. A multi-tier distributed system according to claim 8, wherein the management assistant further includes node updating means for dynamically updating the node specifying means of all of the nodes based on the use statuses of the nodes.

10. A multi-tier distributed system according to claim 8, wherein the management assistant further includes version updating means for dynamically specifying the nodes based on the use statuses of the nodes and updating a version of the nodes.

11. A method of executing a transaction by a multi-tier distributed system, wherein the multi-tier distributed system includes at least an upper tier and a lower tier, the method comprising:
assigning the transaction to an upper node belonging to the upper tier of the multi-tier distributed system, wherein the upper node includes a computer system;
using the upper node, searching for a lower node in the lower tier of the multi-tier distributed system;
assigning the transaction to the lower node based on the searching;
using the upper node, monitoring a running status of the lower node with respect to the transaction;
at the upper node, receiving, from the lower node, a service based on the running status; and
executing the transaction by both the upper node and the lower node based on the service.

12. The method of claim 11, further comprising:
at the lower node, allowing the upper node to monitor the running status of the lower node.

13. The method of claim 11, further comprising:
monitoring the executing of the transaction by a management assistant by collecting statuses of the upper and lower nodes, and controlling functions of the upper and lower nodes with respect to a specific status.

14. The method of claim 13, further comprising:
updating versions for the upper and lower nodes based on statuses of the upper and lower nodes associated with the transaction.

15. At least one non-transitory computer readable medium storing machine readable instructions that when executed by a processor performs a method of executing a transaction by a multi-tier distributed system, wherein the multi-tier distributed system includes at least an upper tier and a lower tier, the method comprising:
assigning the transaction to an upper node belonging to the upper tier of the multi-tier distributed system, wherein the upper node includes a computer system;
using the upper node, searching for a lower node in the lower tier of the multi-tier distributed system;
assigning the transaction to the lower node based on the searching;
using the upper node, monitoring a running status of the lower node with respect to the transaction;
at the upper node, receiving, from the lower node, a service based on the running status; and
executing the transaction by both the upper node and the lower node based on the service.

16. The at least one non-transitory computer readable medium of claim 15, wherein the method further comprises:
at the lower node, allowing the upper node to monitor the running status of the lower node.

17. The at least one non-transitory computer readable medium of claim 16, wherein the method further comprises:
monitoring the executing of the transaction by a management assistant by collecting statuses of the upper and lower nodes, and controlling functions of the upper and lower nodes with respect to a specific status.

18. The at least one non-transitory computer readable medium of claim 17, wherein the method further comprises:
updating versions for the upper and lower nodes based on statuses of the upper and lower nodes associated with the transaction.

* * * * *